United States Patent [19]
Derighetti

[11] Patent Number: 5,324,909
[45] Date of Patent: Jun. 28, 1994

[54] APPARATUS FOR MEASURING AND/OR CONTROLLING THE TENSION IN A RIBBON OR WIRE-TYPE ELECTRODE OF AN ELECTRIC DISCHARGE MACHINE

[75] Inventor: René Derighetti, Losone, Switzerland

[73] Assignee: AG für industrielle Elektronik AGIE Losone bei Locarno, Losone, Switzerland

[21] Appl. No.: 973,770

[22] Filed: Nov. 9, 1992

[30] Foreign Application Priority Data

Nov. 11, 1991 [DE] Fed. Rep. of Germany ....... 4137016

[51] Int. Cl.⁵ .............................................. B73H 7/10
[52] U.S. Cl. .................................. 219/69.12; 226/45; 242/45; 242/75.51; 242/75.53
[58] Field of Search ................. 219/69.12; 226/44, 45; 242/75.53, 45, 75, 75.5, 75.51

[56] References Cited

U.S. PATENT DOCUMENTS

| | | | |
|---|---|---|---|
| 4,262,185 | 4/1981 | Delpretti | 219/69.12 |
| 4,530,471 | 7/1985 | Inoue | 219/69.12 |
| 4,667,078 | 5/1987 | Kilcher et al. | 219/69.12 |
| 5,039,834 | 8/1991 | Obara et al. | 219/69.12 |
| 5,240,194 | 8/1993 | Noirot et al. | 242/45 |

FOREIGN PATENT DOCUMENTS

| | | |
|---|---|---|
| 0355168 | 1/1989 | European Pat. Off. . |
| 0424770 | 10/1990 | European Pat. Off. . |
| 2531572 | 1/1976 | Fed. Rep. of Germany ... 242/75.51 |
| 3419944 | 12/1985 | Fed. Rep. of Germany . |
| 3705000 | 8/1987 | Fed. Rep. of Germany ... 219/69.12 |
| 2265708 | 8/1988 | Fed. Rep. of Germany . |
| 1-285558 | 11/1989 | Japan .................. 242/75 |
| 2-279222 | 11/1990 | Japan .................. 219/69.12 |

Primary Examiner—Geoffrey S. Evans
Attorney, Agent, or Firm—Ralph H. Dougherty

[57] ABSTRACT

An apparatus for measuring and/or controlling the tension in a ribbon or wire-type electrode of an electric discharge machine in which the ribbon or wire-type electrode is passed around a rotatable roller which is in operative engagement with a sensor. The roller is adapted to be driven in rotation by a motor or to be retarded by a brake. A support member for the roller and the motor or for the roller and the brake accommodates the weight of the roller and the motor or of the roller and the brake so that no load caused by the motor or the brake plus the roller acts in the direction of the tensile stress of the electrode. Any movement of the support means can be detected by a sensor, and the magnitude of the tension can be derived by a control unit from the output signal of the sensor. In operation, the control unit determines the tension on the wire and causes the unit to either increase or decrease the resistance caused by the roller.

15 Claims, 4 Drawing Sheets

APPARATUS FOR MEASURING AND/OR CONTROLLING THE TENSION IN A RIBBON OR WIRE-TYPE ELECTRODE OF AN ELECTRIC DISCHARGE MACHINE

FIELD OF THE INVENTION

The instant invention relates to an apparatus for measuring and/or controlling the tension in a ribbon or wire-type electrode of an electric discharge machine in which the ribbon or wire-type electrode is passed around a rotatable roller which is in operative engagement with a sensor means from whose output signal a tension signal can be derived.

BACKGROUND OF THE INVENTION

Such an apparatus is described in EP 0 355 168 A1. It comprises a roller which is supported for rotation on a pivotable lever and around which a tensioned wire electrode is passed. The lever rests on a pressure sensor. A brake disposed upstream in the direction of wire movement is controlled in response to the tensile stress of the wire electrode as detected by the pressure sensor so that the tension in the wire electrode will adopt a predetermined value.

German Patent DE 26 25 349 C2 discloses an apparatus for machining workpieces by spark erosion or electrochemically, using a wire or ribbon-type electrode, a separately driven pair of drive rollers for supplying or removing the electrode being arranged at the two sides of the working length located between guide members. Control of the electrode tension is effected by means of a pivotable roller which is loaded by the electrode against spring pressure or by gravity. A sensor detects the degree of deflection of the roller. The rotary speed of a motor which tensions the electrode is derived from the sensor output signal so that the deflection of the roller is regulated in such a way that the roller will maintain a certain position as much as possible. The means which controls the tensile force is located between the two pairs of drive rollers which are driven at invariable torques. The rotary speed of the drive motor for the drive roller pair is controlled in response to the deflection of the roller.

Another device for controlling the tension in a wire electrode of an electric discharge machine is known from German patent publication DE 32 08 036 A1. This device serves to control the tensile stress between a supply-side drive roller pair toward an operating range and a wire supply reel which is driven by a motor to pay off wire. A roller which is supported for rotation on a pivotable lever and around which the wire is passed is arranged in the wire path between the supply reel and the supply-side drive roller pair. The lever is spring loaded with a view to tensioning the wire electrode. A sensor means is disposed at one end of the lever to detect the deflection of the lever and thus the magnitude of the tensile stress and to generate a control signal by which the motor driving the supply reel is regulated.

DE 22 65 708 C1 describes a means used, in combination with an apparatus for the removal of a wire or ribbon-type electrode in machines for processing workpieces by spark erosion or electrochemically, to cause unvarying tension of the electrode at the discharge end of the electric discharge machine. To accomplish this, a deflectable pulley is provided which causes a loop to be formed of the electrode between a drive roller pair at the discharge end and the take-up reel which is driven by a variable speed motor. The degree of deflection from a central position serves for control of the wind-up speed of the reel such that a constant tension of the electrode is provided at the discharge-side drive roller pair.

OBJECTS OF THE INVENTION

It is the object of the invention to provide an apparatus for measuring and/or controlling the tension in a ribbon or wire-type electrode of an electric discharge machine having a structure that is compact.

It is also an object of the invention to provide such an apparatus in which any loading due to the inherent weight of the apparatus has no influence on the measurement of the tensile stress.

It is a further object to provide such an apparatus that can be mounted on existing machinery in a variety of orientations.

SUMMARY OF THE INVENTION

These objects are achieved by an apparatus in which a roller, connected to either a motor or brake, is wrapped by a ribbon or wire-type electrode, the roller is adapted to be driven in rotation by the motor or retarded by the brake. The apparatus includes a support means for the roller and the motor, or for the roller and the brake, which accommodates the weight of the roller and the motor or of the roller and the brake such that any movement of the support means is detectable by a sensor which generates an output signal from which the magnitude of the tension can be derived.

In the invented apparatus, the roller which is wrapped by a ribbon or wire-type electrode and the motor or the roller plus the brake, respectively, form a unit and, at the same time, their cooperation with a sensor generates a signal from which the magnitude of the tension to be measured can be derived. It is an advantage of the invented apparatus that it can be integrated readily in an electric discharge machine as it requires only little space. This is in contrast to the known devices with which a loop is formed which requires a lot of space when the wire electrode is passed around a deflectable roller.

An essential aspect of the invention resides in the fact that the motor or brake plus tension roller entity is mounted in such a way that any loading due to the inherent weight thereof has no influence on the measurement of the tensile stress. This can be achieved by having the supporting means of the motor or of the brake plus tension roller accommodate the weight. The center of gravity of the entity either may be located deeper than the axis of rotation of the tension roller, or it may be placed on the axis. In the first case, the tension is derived from the extent of deflection of a support means which is supported on a stationary member for rotation about an axis located below the center of gravity, and in the second case from the extent of rotation of the support means about an axis of rotation which extends through the center of gravity of the entity. The torque caused by the tensile stress is compensated by appropriate means in a manner so as to avoid any influence on the measuring process.

The invented apparatus may operate as a brake with an adjustable and controlled wire pull, i.e., an adjustable and controlled torque at the transmission output end. The friction of the transmission is compensated by the measurement of the wire pull and the control of the torque.

The invented apparatus has the advantage that the wire pull or tension can be kept constant at any wire travelling speed between zero and the respective maximum permissible value.

The invented apparatus can be used as a speed controlled drive means for the advance of the wire or ribbon-type electrode at a given speed. Such advancing movement may take place in either direction, namely to withdraw wire or to feed it (wire threading) Changeover between these two operating modes can be effected by simple switchover of an electronic control means.

Further embodiments allow any wire fracture to be sensed, without any delay, by a sudden change in the output signal supplied by the sensor.

BRIEF DESCRIPTION OF THE DRAWINGS

The invention will be more readily understood by referring to the following detailed description and to the accompanying drawings, in which.

DETAILED DESCRIPTION

Figure 1:
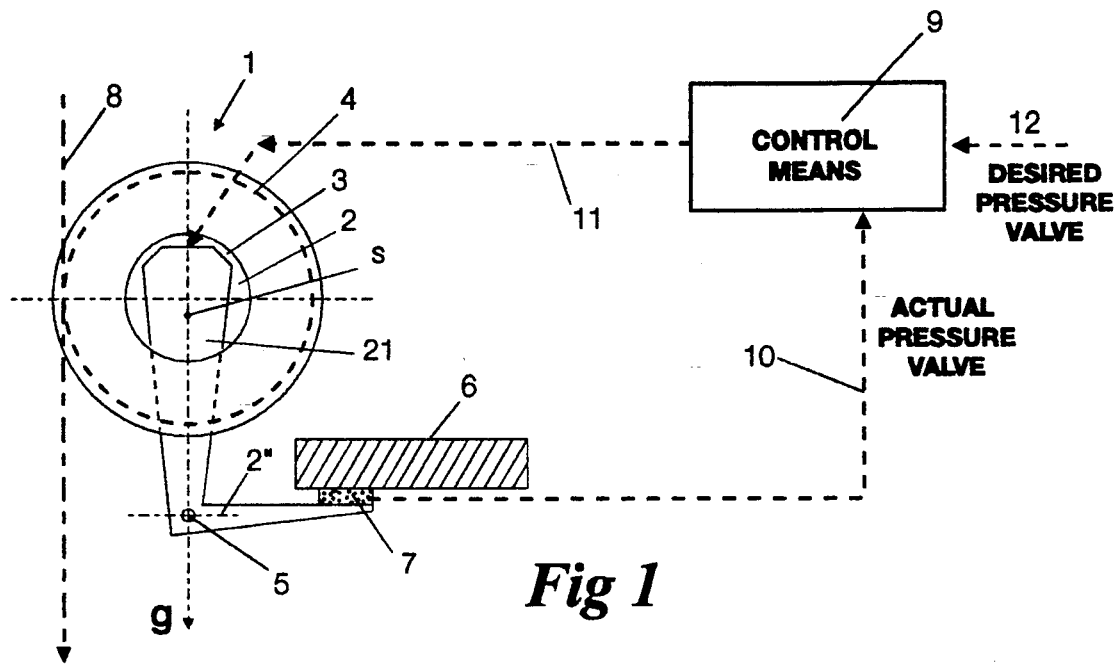
FIG. 1 is a diagrammatic representation of a first embodiment of an apparatus according to the invention.

In each of the figures, the same reference numerals are used to designate equivalent members.

Referring now to the drawings, FIG. 1 shows an apparatus 1 for measuring and controlling the tension of a ribbon or wire-type electrode in accordance with the first embodiment. A support means 2 carries a motor 3 and a tension roller 4 which is connected to the motor 3 so as to be driven in rotation by the same. The support means 2 is in the form of an angle lever having two lever 2' and 2" and is supported in the area of its point or elbow for rotation about an axis 5. The motor 3 is fastened in the free end area of the lever arm 2'.

The free end area of the other lever arm 2" is located opposite a pressure sensor 7 which is mounted on a stationary member of the apparatus.

A ribbon or wire-type electrode 8 moving in the direction of the arrow shown is guided so as to wrap the tension roller 4. For the sake of simplicity, a wire electrode only will be referred in the description to follow, it being understood that ribbon-type electrodes are included as well.

The support means 2, embodied by an angle lever, and the motor 3 attached to it, as well as the tension roller 4 in drive connection with the motor, are disposed in such a way that the axis of rotation 5 lies substantially vertically below the common center of gravity S of the support means, the motor, and the tension roller. G designates the acting gravity. This arrangement makes it possible for the wire electrode 8 to remain entirely free of any load due to the weight of the motor and the tension roller.

The output of the pressure sensor 7 is connected by an electrical lead lo to a control means 9, indicated only diagrammatically. A control output of the control means 9 is connected by an electrical lead 11 to the motor 3. The arrow marked 12 is intended to indicate that a desired pressure value may be preset at control means 9.

Figure 1A:
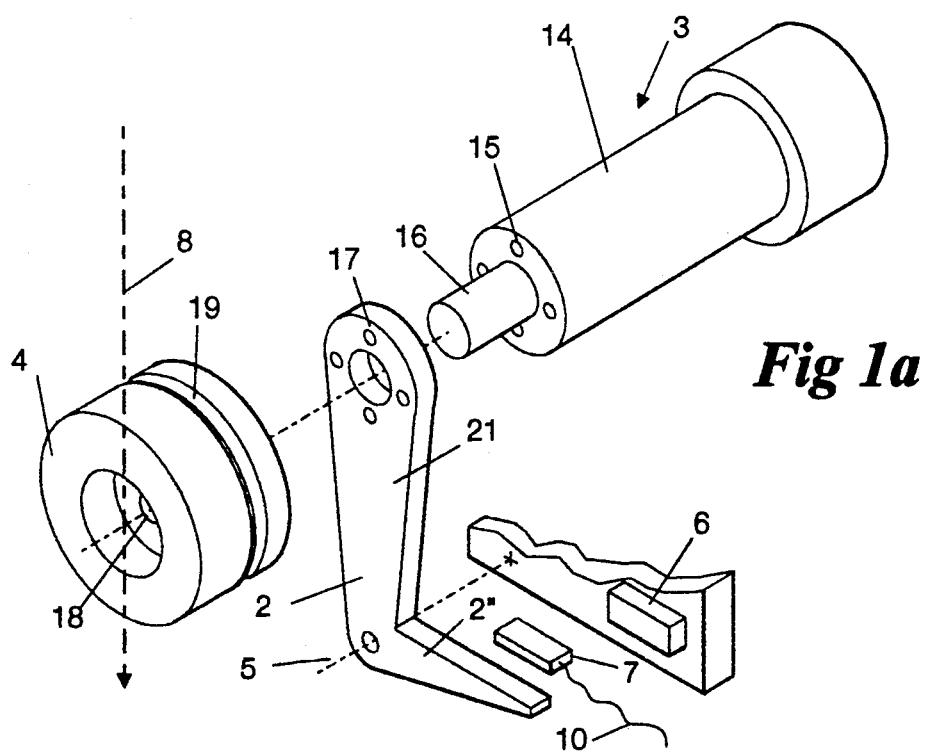
FIG. 1a is an exploded partial view of the embodiment shown in FIG. 1.

Details of the embodiment of FIG. 1 are shown in exploded view in FIG. 1a. At the front end face of the motor housing 14, the motor 3 has four threaded bores 15 of which three are to be seen in the drawing. A portion of the motor shaft protruding beyond the front end face is designated 16.

At the free end of the one lever arm 2' the angle lever 2 has four bores 17 which are aligned with the threaded bores 15 in the front end face of the motor housing 14. Upon assembly of the apparatus, the angle lever 2' is screw-connected with the front end face of the motor housing 14.

The tension roller 4 is formed with a central bore 18. A groove 19 is formed in the circumferential surface of the roller to take up the wire electrode 8 which wraps the tension roller 4. The motor shaft portion 16 projecting out of the motor housing 14 extends into the bore 18 of the roller 4. The roller 4 is fixed for rotation on this portion 16 of the motor shaft.

The apparatus illustrated in FIGS. 1 and 1a operates as follows. When the motor 3 is controlled by the control means 9 so that the motor shaft will rotate in the direction in which pull is exerted on the wire electrode 8 which is fed to the tension roller 4 (the feeding or travelling direction being indicated by the arrow shown on the wire electrode) the angle lever 2 will pivot about axis 5 in such a way that the free area of lever arm 2" will move towards the pressure sensor 7 or exert pressure on the pressure sensor 7, if already in contact with the same. The output signal generated by the pressure sensor 7 is an indication of the amount of tensile stress or tension in the wire electrode 8. This signal presents the actual pressure value which is fed through the electrical lead 10 to the control means 9 to be compared therein with the desired pressure value which has been preset or is entered via 12. The motor current supplied to the motor 3 via the electrical lead 11 is controlled in response to the difference between the rated and actual pressure values in such manner that the difference between those two pressure values will become as small as possible.

Figure 2:
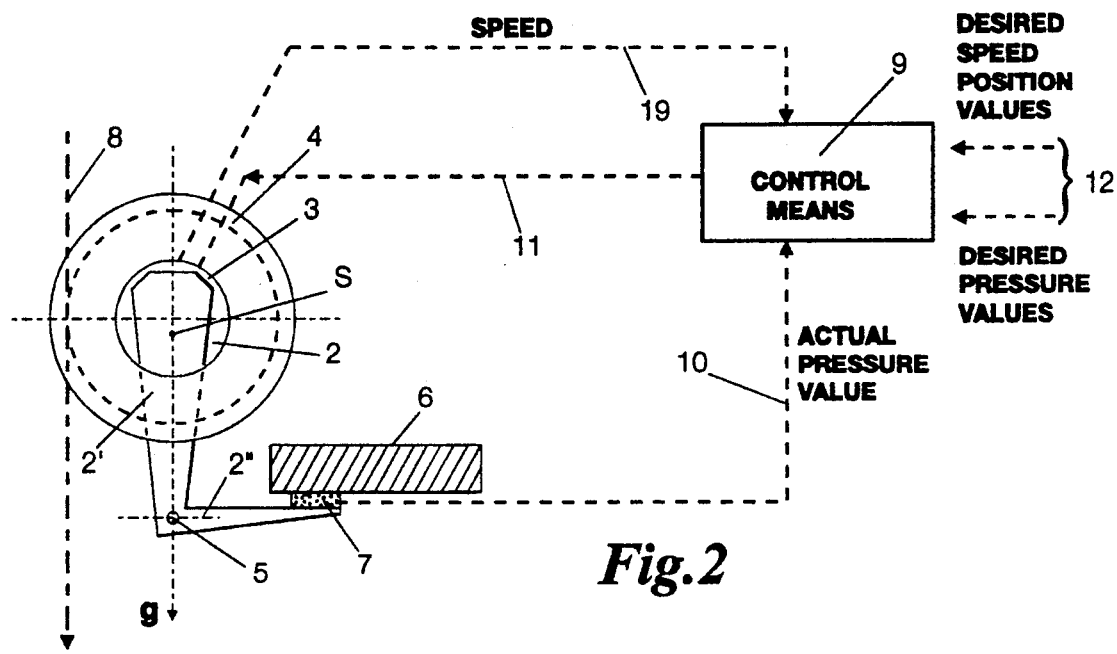
FIG. 2 is a diagrammatic representation of a second embodiment, similar to the one shown in FIG. 1.

The second embodiment illustrated in FIG. 2 differs from the embodiment according to FIGS. 1 and 1a essentially in that a tachometer or speedometer or a rotational speed pickup, not specifically shown, is provided in addition and is driven by the motor 3 or the tension roller 4. This additional device provides an output signal which is applied through the electrical lead 11 to the control means 9. This embodiment illustrated in FIG. 2 further offers the opportunity to enter not only a desired pressure value via leads 12 but also other operational parameters, such as theoretical speed and/or position values. Thus an actual position value or an actual speed value is applied to the control means 9 in addition to the actual pressure value supplied by pressure sensor 7 through the electrical lead 10 in order to control the motor current by way of the electrical lead 11 which connects the motor 3 to the control means 9. Together with the preadjusted desired values, the motor current for motor 3 is controlled in such a way that the difference between the respective actual and desired values becomes as small as possible.

Figure 3:
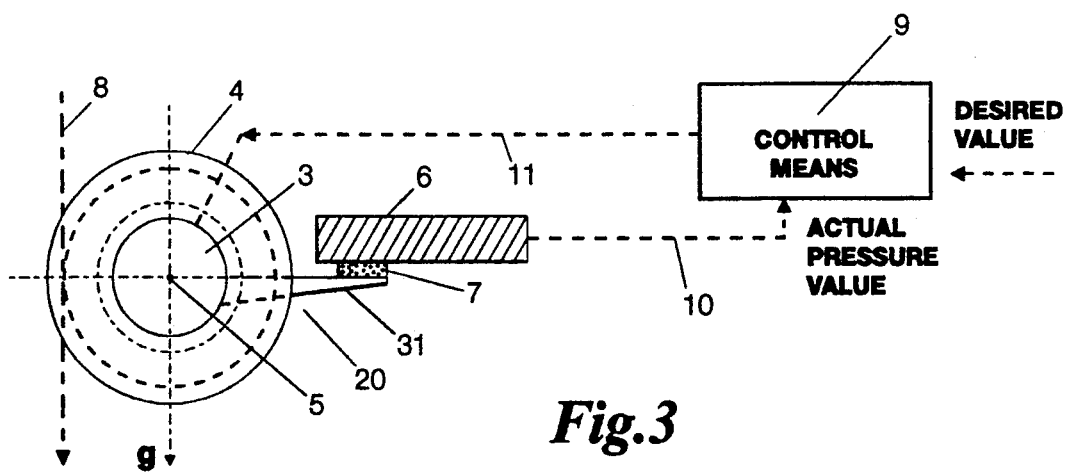
FIG. 3 is a diagrammatic representation of a third embodiment of the invented apparatus.
Figure 3A:
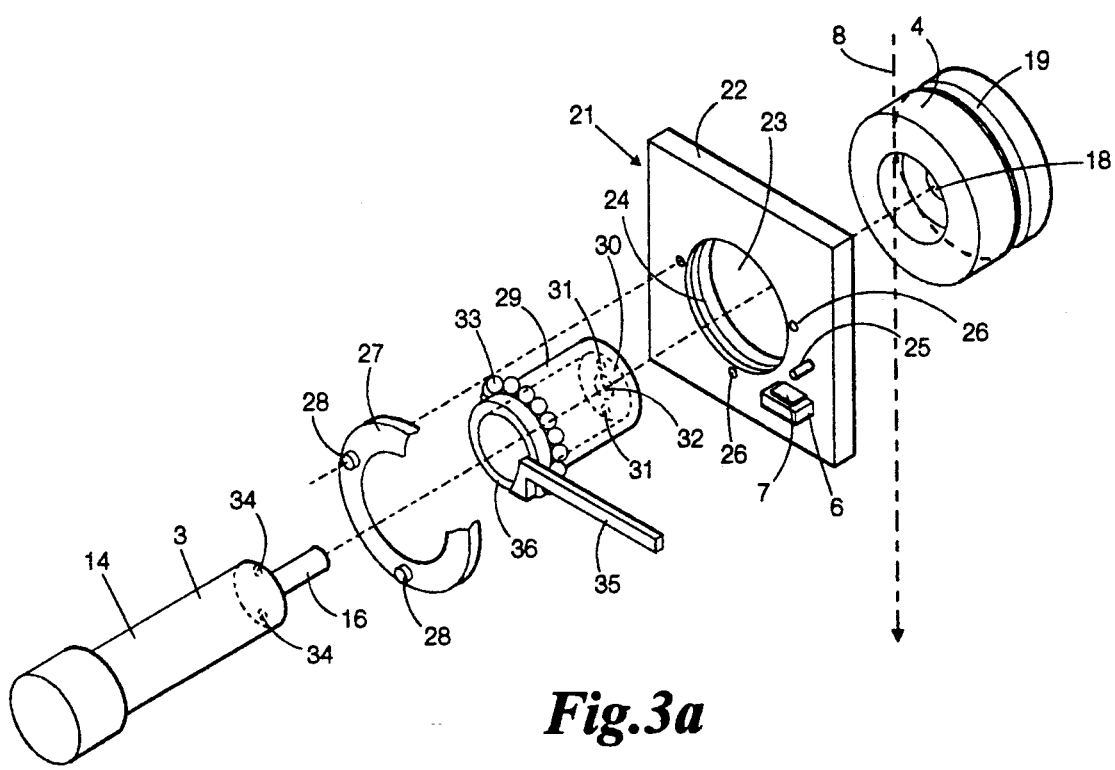
FIG. 3a is an exploded partial view of the embodiment shown in FIG. 3.

FIGS. 3 and 3a present a third embodiment of the apparatus according to the invention. In this embodiment 21 designates a support means for the motor 3 and the tension roller 4 or for a brake and the tension roller 4. Here, the center of gravity of the unit composed of the motor and the tension roller or of the brake and the tension roller is located on the axis of rotation of the motor.

FIG. 3a is a more detailed, exploded view of the support means generally designated 21 in FIG. 3.

The motor 3 and the tension roller 4 which is fixed for rotation to the motor shaft 16 are carried by a stationary attachment member 22, for example part of a machine frame. The attachment member 22 has a central bore 23 of greater diameter and four threaded bores 26 of which three are visible. The inside wall of the central bore 23 is formed with an annular shoulder 24 which serves as a raceway for the balls of a bearing, as will be explained in more detail below.

A carrier member 6 is mounted on the attachment member 22 and a sensor means in the form of a pressure sensor 7 is fastened to the carrier member. Opposite the pressure sensor 7 there is a stop 25 which likewise is mounted on the attachment member 22.

A retainer ring 27 is formed with four bores 28 which are aligned with the arrangement of the threaded bores 26 in the attachment member 22. FIG. 3a shows only two of these bores 28. The retainer ring 27 serves to fasten a ball bearing.

A hollow cylindrical retaining member 29 comprises a circular plate 30 at the end facing the attachment member 22 which plate is firmly connected to the hollow cylindrical retaining member 29. The circular plate 30 is formed with two opposed bores 31 and one central bore 32. Balls 33 of a ball bearing are arranged on the outer circumferential surface of the hollow cylindrical retaining member 29 at the end portion remote from the attachment member 22.

An elongated engagement member 35 is provided which is fastened to the hollow cylindrical retaining member 29 at an annular surface 36 facing the motor housing 14.

As with the other embodiments, a motor 3 is provided which has a housing 14. Two diametrically opposed threaded bores 34 are formed in the front end face of the motor housing 14 which faces the attachment member 22 and are aligned with the bores 31 in the circular plate 30 of the hollow cylindrical retaining member 29.

A tension roller 4 is illustrated at the side of the attachment member 22 opposite the motor housing in FIG. 3a. A groove 19 is formed in the peripheral surface of the tension roller, and the wire electrode 8 is guided in that groove, wrapping the tension roller 4. The direction of movement of the wire electrode 8 is indicated by arrows.

The tension roller 4 also has a central bore 18 serving to receive the motor shaft 16.

In assembled state, the hollow cylindrical retaining member 29 has been introduced into the central bore 23, the balls 33 resting on the inner annular shoulder 24 of the bore 23. The retainer ring 27 is threaded firmly on the attachment member 22. The hollow cylindrical retaining member 29 now extends through the central aperture 23, projecting to a certain extent beyond the attachment member 22. This arrangement permits the hollow cylindrical retaining member 29 to rotate about its longitudinal axis.

With this arrangement, the elongated engagement member 35 extends into the space between the pressure sensor 7 and the stop 25.

The motor 3 has been received by the hollow cylindrical retaining member 29 and has been fixed by bolts passed through the bores 31 in the plate 30 and threaded into the threaded bores 34 in the front end face of the motor housing 14. The motor shaft 16 now passes through the central bore 32 in the plate 32 and on beyond the same. The tension roller 4 is fixed for rotation together with the motor shaft 16.

According to this embodiment, if the tension is to be increased in the wire electrode 8, moving in the direction of the arrows, a torque must be exerted on the tension roller 4 creating tensile force acting in the direction of the arrows upon the wire electrode 8. Therefore, in FIG. 3a, the tension roller 4 and the motor drive shaft 16 must be rotated in counterclockwise. As the motor housing 14 is mounted for rotation about its longitudinal axis it will rotate in clockwise sense, whereby the engagement member 35 will pressurize the pressure sensor 7.

The pressure sensor 7 output signal is applied to the control means 9 where it is processed, in consideration of the preset magnitudes, so as to control the motor current in the desired fashion, namely in the sense of increasing it if the tension is to be increased or in the opposite sense in order to reduce the tension applied. The magnitude of the given actual tensile stress can be derived from the output signal of the pressure sensor 7.

Figure 4:
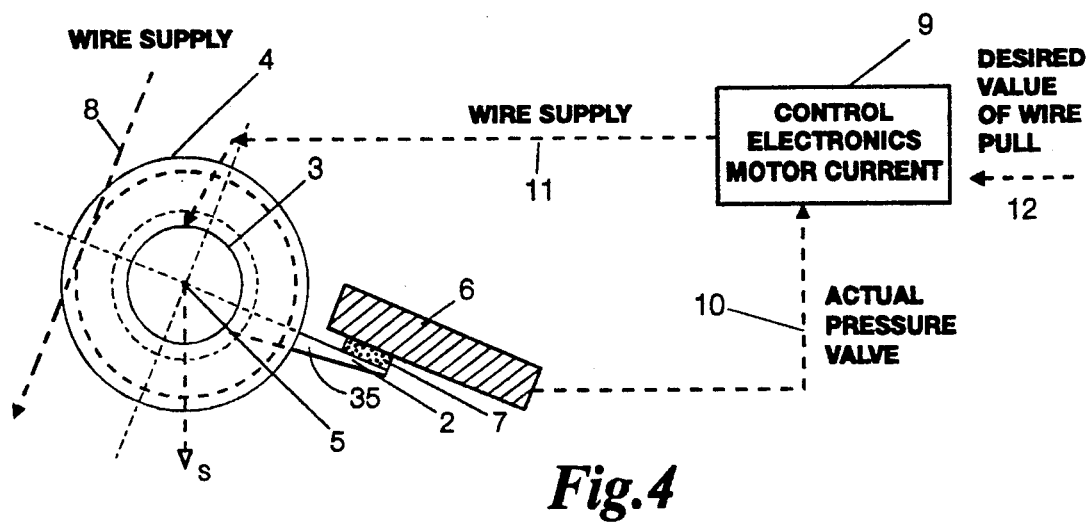
FIG. 4 shows the embodiment of FIG. 3 in a different orientation.

The embodiment described with reference to FIGS. 3 and 3a permits a relatively high degree of freedom in the actual arrangement in an electric discharge machine. The presentation of FIG. 4, for instance, shows that it is not necessary to absolutely position the elongated engagement member 35 horizontally. In view of the fact that this embodiment has the center of gravity of the motor 3 and tension roller 4 unit lie on the axis of rotation of the motor 3, it is permissible to have the elongated engagement member 35 extend at an angle to the horizontal. This embodiment is especially well suited for electric discharge machines comprising pivotable guide heads.

Figure 5:
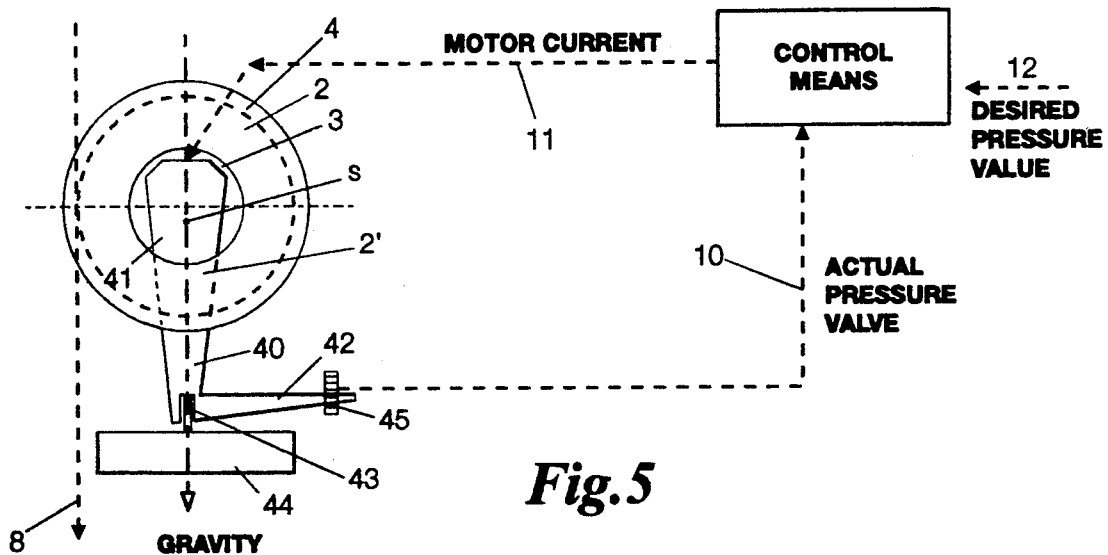
FIG. 5 is a diagrammatic representation of a fourth embodiment of the invented apparatus.

As was the case with the embodiment of FIGS. 1 and 1a, the embodiment of FIG. 5 comprises a support means 2 embodied by an angle lever 40, the motor 3 and the tension roller 4 fixed for rotation together with the motor drive shaft being carried at the free end of the one lever arm 41 thereof. The center of gravity S of the unit composed of the support means 2, the motor 3, and the tension roller 4 lies vertically below the axis of rotation of the drive shaft of the motor 3 or tension roller. However, the angle lever 40 is not mounted on a stationary member 44, such as a machine frame for rotation about an axis. Instead, an elastically resilient fastening member 43 which is mounted on a stationary member 44 is provided in the point area of the angle lever 40. The free end area of the other lever arm 42 of the angle lever 40 is in operative engagement with a displacement sensor 45 so that a change in position of the end area of this lever arm 42, i.e., a pivoting motion in this case, will be detected.

The displacement sensor 45 used, for instance, may be an optically or magnetically operating sensor means whose output signal is applied to a control means for control of the motor current.

What is claimed is:

1. An apparatus for measuring and/or controlling the tension in a ribbon or wire-type electrode of an electric discharge machine, comprising:
    a rotatable roller adapted to be wrapped by a ribbon or wire-type electrode;
    rotation controlling means operatively connected to said roller, said rotation controlling means being selected from the group consisting of a motor and a brake;
    support means for the roller and rotation controlling means to accommodate the weight of the roller and the rotation controlling means; and
    a sensor in operative engagement with the support means capable of detecting any movement of the support means and generating an output signal;
    whereby any movement of the support means is detectable by the sensor which generates the output signal from which the magnitude of the tension on the ribbon or wire type electrode can be derived.

2. The apparatus according to claim 1, wherein the support means is supported for rotation on an axis of rotation located vertically below the center of gravity of the roller and rotation controlling means.

3. The apparatus according to claim 1, wherein the support means is supported for rotation about an axis of rotation and the center of gravity of the roller and the rotation controlling means is located on said axis of rotation.

4. The apparatus according to claim 3, wherein the axis of rotation of the support means coincides with one of the axis of the motor drive shaft and the axis of the roller.

5. The apparatus according to claim 3, wherein the axis of rotation of the support means coincides with the axis of the motor drive shaft and the axis of the roller.

6. The apparatus according to claim 2, wherein said sensor is a pressure sensor, and the support means is an angle lever having two arms connected by an elbow, the axis of rotation passing through the elbow of the lever, wherein the rotation controlling means and the roller are mounted in the free end area of the one lever arm, and the free end area of the other lever arm of the lever is adapted to be moved into pressure engagement with said sensor.

7. The apparatus according to claim 2, wherein the support means is pressurizable by a force which is adapted to generate a force that counteracts any movement of the support means caused by the tension.

8. The apparatus according to claim 7, wherein the force which pressurizes the support means is spring pressure.

9. The apparatus according to claim 2, wherein the support means is an angle lever having two arms connected by an elbow, the elbow being mounted on a stationary member by way of an elastically resilient member, the rotation controlling means and the roller being mounted in the free end area of one of the lever arms of the angle lever, and the free end area of the other lever arm of the angle lever being adapted to be moved into operative engagement with the sensor.

10. The apparatus according to claim 9, wherein the elastically resilient member is formed integrally with the angle lever.

11. The apparatus according to claim 9, wherein the sensor is a displacement sensor.

12. The apparatus according to claim 1, further comprising:
    control means operably connected to said motor and said sensor, and adapted to receive an output signal from the sensor and to control the speed of the motor responsive to said output signal.

13. The apparatus according to claim 1, further comprising:
    said rotation controlling means being a motor provided with a drive shaft;
    an angular sensor operably engaged with the drive shaft of the motor and capable of generating an output signal; and
    control means operably connected to said motor, said sensor and said angular sensor, said control means being capable of receiving the output from said sensor and said angular sensor; and capable of controlling the speed of the motor responsive to said output signals.

14. The apparatus according to claim 1, further comprising:
    said rotation controlling means being a motor provided with a drive shaft;
    a speedometer operably engaged with the drive shaft of the motor and capable of generating an output signal; and
    control means operably connected to said motor, said sensing means and said speedometer, said control means being capable of receiving the output from said sensor and said speedometer, and of controlling the speed of the motor responsive to said output signals.

15. The apparatus according to claim 12, wherein the control means is adapted to generate an alarm signal when the output signal applied to the control means from the sensor indicates breakage of the ribbon or wire-type electrode.

* * * * *